US008589947B2

(12) United States Patent
Potter et al.

(10) Patent No.: US 8,589,947 B2
(45) Date of Patent: Nov. 19, 2013

(54) METHODS, SYSTEMS, AND MEDIA FOR APPLICATION FAULT CONTAINMENT

(75) Inventors: Shaya Joseph Potter, New York, NY (US); Jason Nieh, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/104,246

(22) Filed: May 10, 2011

(65) Prior Publication Data
US 2012/0210333 A1 Aug. 16, 2012

Related U.S. Application Data

(60) Provisional application No. 61/333,518, filed on May 11, 2010.

(51) Int. Cl.
G06F 9/44 (2006.01)
G06F 17/21 (2006.01)

(52) U.S. Cl.
USPC ............................................ 719/313; 715/236

(58) Field of Classification Search
None
See application file for complete search history.

(56) References Cited

U.S. PATENT DOCUMENTS 6,151,610 A * 11/2000 Senn et al. ............... 715/236
2010/0122343 A1* 5/2010 Ghosh et al. ............... 726/23
2011/0138474 A1* 6/2011 Yee et al. .................. 726/26

OTHER PUBLICATIONS

Acharya, A., and Raje, M., "MAPbox: Using Parameterized Behavior Classes to Confine Applications" In Proceedings of the 9th USENIX Security Symposium, Denver, CO, USA, Aug. 1-17, 2000.
Adobe Systems Incorporated, "Security Updates Available for Adobe Reader and Acrobat Versions 9 and Earlier", Mar. 24, 2009, available at: http://www.adobe.com/support/security/advisories/apsa09-01.html.
Baratto, R.A., et al., "THINC: A Remote Display Architecture for Thin-Client Computing", In Technical Report CUCS-027-04, Department of Computer Science, Columbia University, Jul. 2004.
Berman, A., et al., "TRON: Process-Specific File Protection for the UNIX Operating System", In Proceedings of 1995 USENIX Winter Technical Conference (TCON'95), New Orleans, LA, USA, Jan. 1995, pp. 165-175.
Bitdefender, "Trojan.PWS.ChromeInject.B", Nov. 2008, available at: http://www.bitdefender.com/VIRUS-1000451-en--Trojan-PWS-ChromeInject-B.html.

(Continued)

Primary Examiner — Andy Ho
Assistant Examiner — Abdou Seye
(74) Attorney, Agent, or Firm — Byrne Poh LLP

(57) ABSTRACT

Methods, systems; and media for application fault containment are provided. In accordance with some embodiments, a method for application fault containment is provided, the method comprising: determining a plurality of applications associated with a processing device; isolating each of the plurality of applications into an application container; receiving a user selection of one of the plurality of applications; and creating the application container of a container type for the user selected application in response to receiving the user selection; wherein, upon determining that the container type is a persistent container, configuring the created application container to maintain state information across executions of the user selected application, and wherein, upon determining that the container type is an ephemeral container, configuring the created application container to be removed after a single execution of the user selected application.

22 Claims, 8 Drawing Sheets

(56) References Cited

OTHER PUBLICATIONS

Cowan, C. et al. "SubDomain: Parsimonious Server Security", Proceedings of the 14th USENIX System Administration Conference (LISA 2000), New Orleans, LA, USA, Mar. 2000, pp. 1-20.
Gettys, J. and Scheifler, R.W., "Xlib-C Language X Interface", X Consortium, Inc., 1996.
Gilmore, M., "-10 Day Cert Advisory on PDF Files", Jun. 13, 2003, available at: htttp://seclists.org/fulldisclosure/2003/Jun/0463.html.
Jain, S., et al. "Application-Level Isolation and Recovery with Solitude", In Proceedings of the 3rd ACM SIGOPS/EuroSys European Conference on Computer Systems (EuroSys '08), Glasgow, Scotland, UK, Apr. 1-4, 2008, pp. 95-107.
Kamp, P.H. and Watson, R.N.M., "Jails: Confining the Omnipotent Root", In 2nd International SANE Conference (SANE), Maastricht, The Netherlands, May 2000.
Lampson, B., "Accountability and Freedom", Sep. 26, 2005, available at: http://research.microsoft.com/en-us/um/people/blampson/Slides/AccountabilityAndFreedomAbstract.htm.
Liang, Z., et al. "Isolated Program Execution: An Application Transparent Approach for Executing Untrusted Programs", In Proceedings of the 19th Annual Computer Security Applications Conference (ACSAC), Las Vegas, NV, USA, Dec. 8-12, 2003, pp. 182-191.
Loscocco, P. and Smalley, S., "Integrating Flexible Support for Security Policies into the Linux Operating System", In Proceedings of the FREENIX Track: 2001 USENIX Annual Technical Conference, Boston, MA, USA, Jun. 25-30, 2001, pp. 29-40.
Osman, S. et al., "The Design and Implementation of Zap: A System for Migrating Computing Environments", In Proceedings of the 5th Symposium on Operating Systems Design and Implementation (OSDI 2002), Dec. 2002, pp. 361-376.
Pfaff, B., et al., "Virtualization Aware File Systems: Getting Beyond the Limitations of Virtual Disks", In Proceedings of the 3rd Symposium on Networked Systems Design & Implementation (NSDI '06), May 2006, pp. 353-366.
Porter, T. and Duff, T., "Compositing Digital Images", In Computer Graphics, vol. 18, No. 3, Jul. 1984, pp. 253-259.
Price, D. and Tucker, A., "Solaris Zones: Operating System Support for Consolidating Commercial Workloads", In Proceedings of the 18th USENIX Conference on System Administration (LISA '04), Atlanta, GA, USA, Nov. 14-19, 2004, pp. 243-256.
Provos, N., "Improving Host Security with System Call Policies", In Proceedings of the 12th Conference on USENIX Security Symposium (SSYM '03), Washington, DC, USA, Aug. 2003, pp. 257-272.
Reis, C. and Gribble, S.D., "Isolating Web Programs in Modern Browser Architectures", In 4th ACM European Conference on Computer Systems (EuroSys '09), Nuremberg, DE, Apr. 1-3, 2009.
Soltesz, S., et al., "Container-Based Operating System Virtualization: A Scalable, High Performance Alternative to Hypervisors", In ACM SIGOPS Operating Systems Review (EuroSys'07)—Conference Proceedings, vol. 41, No. 3, Jun. 2007, pp. 275-287.
Sun Microsystems, Inc., "Solaris ZFS Administration Guide", Jan. 2010, available at: http://docs.oracle.com/cd/E19082-01/817-2271/817-2271.pdf.
VMware Inc., "VMware Workstation 6.5 Release Notes", Oct. 15, 2008, available at: http://www.wmvare.com/support/ws65/doc/releasenotes$_{13}$ ws65.html.
Wagner, D.A., "Janus: An Approach for Confinement of Untrusted Applications", Master's Thesis, University of California, Berkeley, 1999.
Whitaker, A., et al., "Scale and Performance in the Denali Isolation Kernel", In Proceedings of the Fifth Symposium on Operating Systems Design and Implementation (OSDI 2002), Boston, MA, USA, Dec. 2002.
Wright, C.P., et al., "Versatility and Unix Semantics in a Fan-Out Unification File System", Technical Report, Stony Brook University, FSL-04-01b, Jan. 2004, pp. 1-14.

\* cited by examiner

METHODS, SYSTEMS, AND MEDIA FOR APPLICATION FAULT CONTAINMENT

CROSS REFERENCE TO RELATED APPLICATION

This application claims the benefit of U.S. Provisional Patent Application No. 61/333,518, filed May 11, 2010, which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosed subject matter relates to methods, systems, and media for application fault containment. More particularly, the disclosed subject matter relates to compartmentalizing applications using persistent containers and/or ephemeral containers.

BACKGROUND

With the use of highly connected computers, desktop security and privacy are major concerns. Users of these highly connected computers are constantly exposed to untrusted data that can be received through the Internet by, for example, visiting new web sites, downloading files, and sending e-mails to strangers or untrusted sources. These activities use information whose safety cannot be verified by the user and, in some cases, an attacker can construct this information to exploit bugs and/or vulnerabilities in applications. In doing this, the attacker can, for example, take control of a user's desktop computing device to exfiltrate sensitive information. For example, a significant vulnerability was recently discovered in Adobe Acrobat products that allowed an attacker to take control of a desktop computing device when a maliciously constructed PDF file was opened. The prevalence of untrusted data and vulnerable or buggy software makes application fault containment increasingly important.

Many attempts have been made to isolate applications from one another using approaches, such as the use of virtual machines. For example, separate virtual machines have been used for moving applications into distinct environments. However, these approaches suffer from an unresolved tension between ease of use (e.g., the look and feel of a desktop environment) and degree of fault containment.

There is therefore a need in the art for approaches that compartmentalize applications into isolated containers for application fault containment. Accordingly, it is desirable to provide methods, systems, and media that overcome these and other deficiencies of the prior art.

For example, approaches that isolate applications into containers for application fault containment while retaining the integrated look, feel, and ease of use of a desktop environment are provided. In another example, approaches for application fault containment are provided without the need for modifying applications or the operating system (e.g., kernel changes).

SUMMARY

Methods, systems, and media for application fault containment are provided.

Generally speaking, mechanisms are provided that determine which applications are associated with a computing system and that isolate each of these applications into a container (sometimes referred to herein as a "containerized desktop system"). Each application container can be an independent software appliance that provides the system services the application needs for execution. These application containers can inhibit an application exploit from compromising the user's entire desktop computing system (e.g., other applications, other files, etc.).

In some embodiments, the application container can be an ephemeral container. As described herein, an ephemeral container can be an execution environment that has no access to user data (e.g., personal finance data, trusted data, etc.), where such a container is created or instantiated for a single application execution. That is, once the single application execution is finished executing, the ephemeral container is removed (e.g., deleted or removed and not reused for a subsequent application execution). Ephemeral containers can be used to provide the integrated look and feel of a desktop environment while preventing cross-contamination (e.g., exploitation) across containers. Accordingly, ephemeral containers can inhibit compromises even when used with untrusted data that triggers application exploits as those exploits cannot persist. In addition, it should be noted that ephemeral containers can protect users from already compromised applications. When an application or any other portion of a computer device has been compromised due to usage with untrusted data, a newly instantiated ephemeral container running that application in parallel remains uncompromised because it starts from a clean state. The ephemeral container is created or instantiated for a single application execution and, once the single application execution is finished executing, the ephemeral container is removed. Moreover, files stored in each container are private and are not accessible outside of their respective container.

Alternatively or additionally, the application container can be a persistent container. More particularly, a persistent container can be used to maintain persistent state across executions while preventing compromises in such applications from affecting the entire computing system. In one embodiment, a persistent container can be created for each application. This can, for example, avoid the need to track which persistent application container contains which pieces of persistent information. In another embodiment, some applications can be run only in persistent containers while other applications can be configured to run in both persistent containers and ephemeral containers.

In some embodiments, these mechanisms include approaches for managing and displaying containers. For example, these mechanisms can include approaches for displaying application windows corresponding to an application container and displaying running application windows in a single display view. In another example, these mechanisms can include approaches for allowing applications in one container to instantiate an ephemeral container and cause execution of an application within that ephemeral container. In yet another example, these mechanisms can include a Virtual Layered File System (VLFS) for creating file systems for each container.

It should be noted that these mechanisms can be used in a variety of applications, such as a system that provides transparent application fault containment while retaining the ease of use of an integrated desktop environment. More particularly, these mechanisms can be used to improve computer security and privacy, thereby limiting damage from vulnerabilities, while providing an integrated computing environment without modifying application or operating system kernel.

In accordance with various embodiments, a method for application fault containment is provided, the method comprising: determining a plurality of applications associated with a processing device; isolating each of the plurality of applications into an application container; receiving a user selection of one of the plurality of applications; and creating the application container of a container type for the user selected application in response to receiving the user selection; wherein, upon determining that the container type is a persistent container, configuring the created application container to maintain state information across executions of the user selected application, and wherein, upon determining that the container type is an ephemeral container, configuring the created application container to be removed after a single execution of the user selected application.

In some embodiments, a system for application fault containment is provided, the system comprising a processor that: determines a plurality of applications associated with a processing device; isolates each of the plurality of applications into an application container; receives a user selection of one of the plurality of applications; and creates the application container of a container type for the user selected application in response to receiving the user selection; wherein, upon determining that the container type is a persistent container, configures the created application container to maintain state information across executions of the user selected application, and wherein, upon determining that the container type is an ephemeral container, configures the created application container to be removed after a single execution of the user selected application.

In accordance with some embodiments, a non-transitory computer-readable medium containing computer-executable instructions that, when executed by a processor, cause the processor to perform a method for detecting covert malware in a computing environment is provided. The method comprises: determining a plurality of applications associated with a processing device; isolating each of the plurality of applications into an application container; receiving a user selection of one of the plurality of applications; and creating the application container of a container type for the user selected application in response to receiving the user selection; wherein, upon determining that the container type is a persistent container, configuring the created application container to maintain state information across executions of the user selected application, and wherein, upon determining that the container type is an ephemeral container, configuring the created application container to be removed after a single execution of the user selected application.

DETAILED DESCRIPTION

In accordance with various embodiments of the disclosed subject matter, methods, systems, and media for application fault containment are provided.

Figure 1:
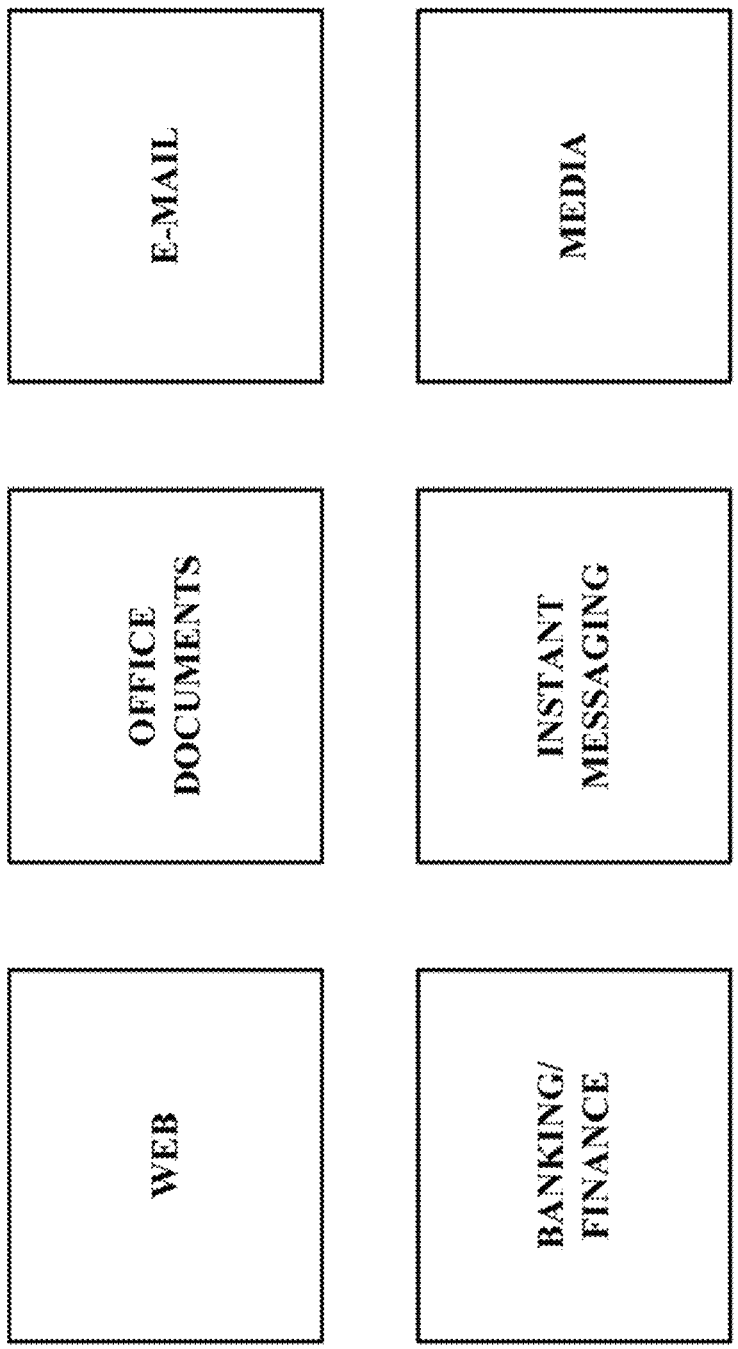
FIG. 1 illustrates an example of multiple applications that can be isolated into application containers in accordance with some embodiments of the disclosed subject matter.

Generally speaking, mechanisms are provided that determine which applications are associated with a computing system and that isolate each of these applications into a container. Each application container can be an independent software appliance that provides the system services the application needs for execution. These application containers can inhibit an application exploit from compromising the user's entire desktop computing system (e.g., other applications, other files, etc.). For example, as shown in FIG. 1, different applications, such as web applications, office document applications, e-mail applications, applications relating to banking/finance, instant messaging (IM) applications, and media applications, can be isolated from a user's computing device. By isolating applications into different containers (e.g., a web browser container that is separate from a personal finance container), any compromise from one container is confined to that container. For example, web browsing using a web browser container is confined to that container and would not be able to access or corrupt personal finance information in a personal finance container. As a result, containers can be used to prevent compromises when used with untrusted data that triggers application exploits because those exploits cannot persist.

As used herein, an application in the containerized desktop system can be a software appliance that is composed of multiple programs that are used together in a single environment to accomplish a specific task. For example, when isolating applications, a web browsing application and a word processing application are considered separate applications and are isolated from one another. In another example, users of the containerized desktop system can install and configure separate applications that include one or more of the same programs but are used for different purposes and isolated from one another. In a more particular example, a user can have a banking application that contains a web browser for accessing a website associated with the user's bank and the user can also have a web surfing application that also contains a web browser for general web browsing, which is isolated from the banking application. Both appliances can use the same web browsing program and can be listed as different applications in the user's application menu.

In some embodiments, the application container can be an ephemeral container. More particularly, an ephemeral container can be an execution environment that has no access to user data (e.g., personal finance data), where such a container is created or instantiated for a single application execution. That is, once the single application execution is finished executing, the ephemeral container is removed (e.g., deleted or removed and not reused for another application execution). Users can concurrently run multiple ephemeral containers and, in some cases, multiple ephemeral containers for the same application. For example, when viewing Adobe Acrobat documents in Portable Document Format (PDF), a web browsing application can automatically instantiate an ephemeral PDF viewer container to view an individual PDF document available from the web and a finance application can instantiate an ephemeral. PDF viewer container to view a PDF document containing trusted financial information. In another example, a web browsing application can instantiate multiple ephemeral PDF viewer containers, where each ephemeral container is used to view a different document.

It should be noted that the use of ephemeral containers can provide the integrated look and feel of a desktop environment while preventing cross-contamination (e.g., exploitation) across containers. For example, when viewing Adobe Acrobat documents in PDF format, a web browsing application can automatically instantiate an ephemeral PDF viewer container to view an individual PDF document. More particularly, if the viewed PDF document is malicious (e.g., it contains malicious code or malware), the malicious code has no effect on the viewing of other PDF files or documents as the ephemeral container instance that has been exploited is not to be used again. The malicious code or the exploit has no persistent effect on the system.

It should also be noted that the use of ephemeral containers can protect users from compromises that have already occurred on a user's computer. For example, if a web browser has been compromised due to its interaction with untrusted data during usage, parallel and future uses of the web browser may allow an attacker to exfiltrate or steal sensitive information (e.g., passwords, financial information, etc.) when the user accesses particular websites, such as those for online banking, e-mail, and/or any other suitable website. As ephemeral containers are created for a single application execution and created from a clean slate, ephemeral containers are not affected by previous application usage. In the example of a web browser container, an ephemeral web browser container that is created for accessing online financial information cannot be exploited by an already compromised web browser and is isolated from other exploits.

In some embodiments, the containerized desktop system allows applications to launch other applications in separate ephemeral containers. More particularly, the use of ephemeral containers can provide a mechanism for allowing applications to launch other applications safely. For example, a user at a computing device may receive e-mail attachments in the form of PDF documents. To avoid compromising the e-mail container by opening an untrusted PDF document that may contain malicious code, the e-mail container creates a separate ephemeral container for viewing the PDF document in response to the user selecting to view the document. If the PDF document contains malicious code, the PDF document has no effect on the e-mail container or any other application or container on the computing device.

Accordingly, ephemeral containers can inhibit compromises even when used with untrusted data that triggers application exploits as those exploits cannot persist. In addition, it should also be noted that ephemeral containers can protect users from compromised applications. When an application has been compromised due to usage with untrusted data, a newly instantiated ephemeral container running that application in parallel remains uncompromised because it starts from a clean state. That is, the ephemeral container is created or instantiated for a single application execution and, once the single application execution is finished execution, the ephemeral container is removed. Moreover, files stored in each container are private and not accessible outside of their respective container.

In some embodiments, ephemeral containers can be used to protect user privacy while using the Internet. For example, some websites require the acceptance of cookies or other tracking code when visiting or accessing a portion of a website. These cookies or other tracking code allow advertisers to track user behavior, thereby compromising user privacy. Instead of selective cookie rejection, which can be burdensome on the user, or privacy mode in a web browser, which requires functional modification of the web browser, the containerized desktop system protects user privacy by instantiating multiple ephemeral web browsing containers simultaneously, where each container accesses a particular website and maintains separate cookies. This makes it difficult to track users across websites using cookies.

Alternatively or additionally, the application container can be a persistent container. More particularly, a persistent container can be used to maintain persistent state information across executions while preventing compromises in such applications from affecting the entire computing system. In one embodiment, a persistent container can be created for each application. This can, for example, avoid the need to track which persistent application container contains which pieces of persistent information. In another embodiment, some applications can be run only in persistent containers while other applications can be configured to run in both persistent containers and ephemeral containers.

In a more particular example, an e-mail application can be configured to run in persistent containers to maintain e-mail state information across application executions. On the other hand, a word processing application can be configured to run in both persistent containers and ephemeral containers, where a word processing application can be used in a persistent container to access a user's trusted local documents and the same word processing application can be used in an ephemeral container to access documents retrieved or downloaded from the Internet. Similarly, a web browsing application can be configured to run in both persistent containers and ephemeral containers, where a web browsing application can be used in a persistent container to store browsing history, plug-in applications, bookmarks, and other trusted user information and another web browsing application (running the same web browser) can be used in an ephemeral container to access untrusted websites.

Figure 2:
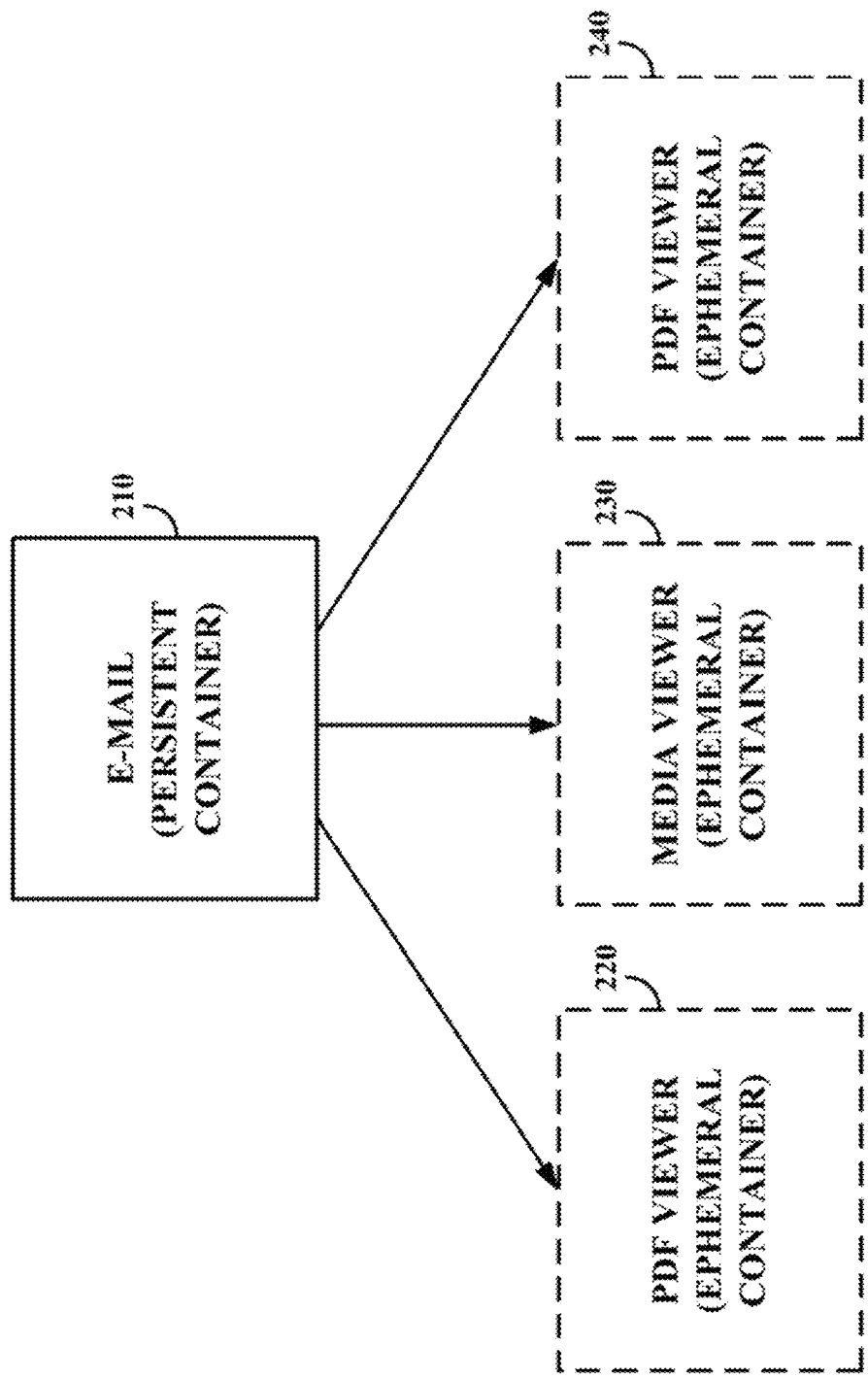
FIG. 2 illustrates a representation of persistent containers and ephemeral containers for various applications and an implementation that allows one container to instantiate one or more ephemeral containers in accordance with some embodiments of the disclosed subject matter.

As shown in FIG. 2, an e-mail application can be launched in a persistent e-mail container 210 that maintains e-mail state across application executions. In response to a user selecting to view an attachment to a particular e-mail, the e-mail application running in persistent e-mail container 210 can instantiate an ephemeral PDF viewer containers 220 and 240 for viewing different PDF documents, an ephemeral media viewer container 230 for viewing or playing back media files, and/or any other suitable ephemeral containers. Note that in FIG. 2 the ephemeral containers are represented with a dashed border, while persistent containers are represented with a solid border. Similarly, when displaying application windows relating to these containers, the containerized desktop system can modify the appearance of these applications windows such that the user can readily discern whether an application has been launched in a persistent container or an ephemeral container.

In addition, persistent containers can be used to isolate persistent data. For example, office documents that are viewed and edited in an office document container can be isolated from financial data (e.g., QuickBooks data, a stock portfolio analysis, etc.) that is accessed by a financial container. In another example, documents relating to academic research can be accessed by an academic work container that includes a word processing program and can be isolated from blog information accessed by a personal container that includes the same word processing program.

In some embodiments, the containerized desktop system allows users to manage the files in persistent containers and ephemeral containers. More particularly, the containerized desktop system can provide a desktop environment on a computing device with a persistent container that provides a file explorer or other suitable file management application with access to each of the containers. This persistent container can be configured to have read-write access, thereby allow a user to move files between containers. For example, using this particular persistent container, the user can move a file from an ephemeral container, which is removed after the single application execution, to a persistent container for its use. In a more particular example, in response to opening an attachment to an e-mail in an ephemeral container, the user is provided with the opportunity to move the attachment to a persistent container using the file explorer container. It should be noted that, in some embodiments, the containerized desktop system inhibits the file explorer container from being configured as an ephemeral container and from being invoked by other applications on the system. This prevents an exploited container from propagating to other containers.

Figure 3:
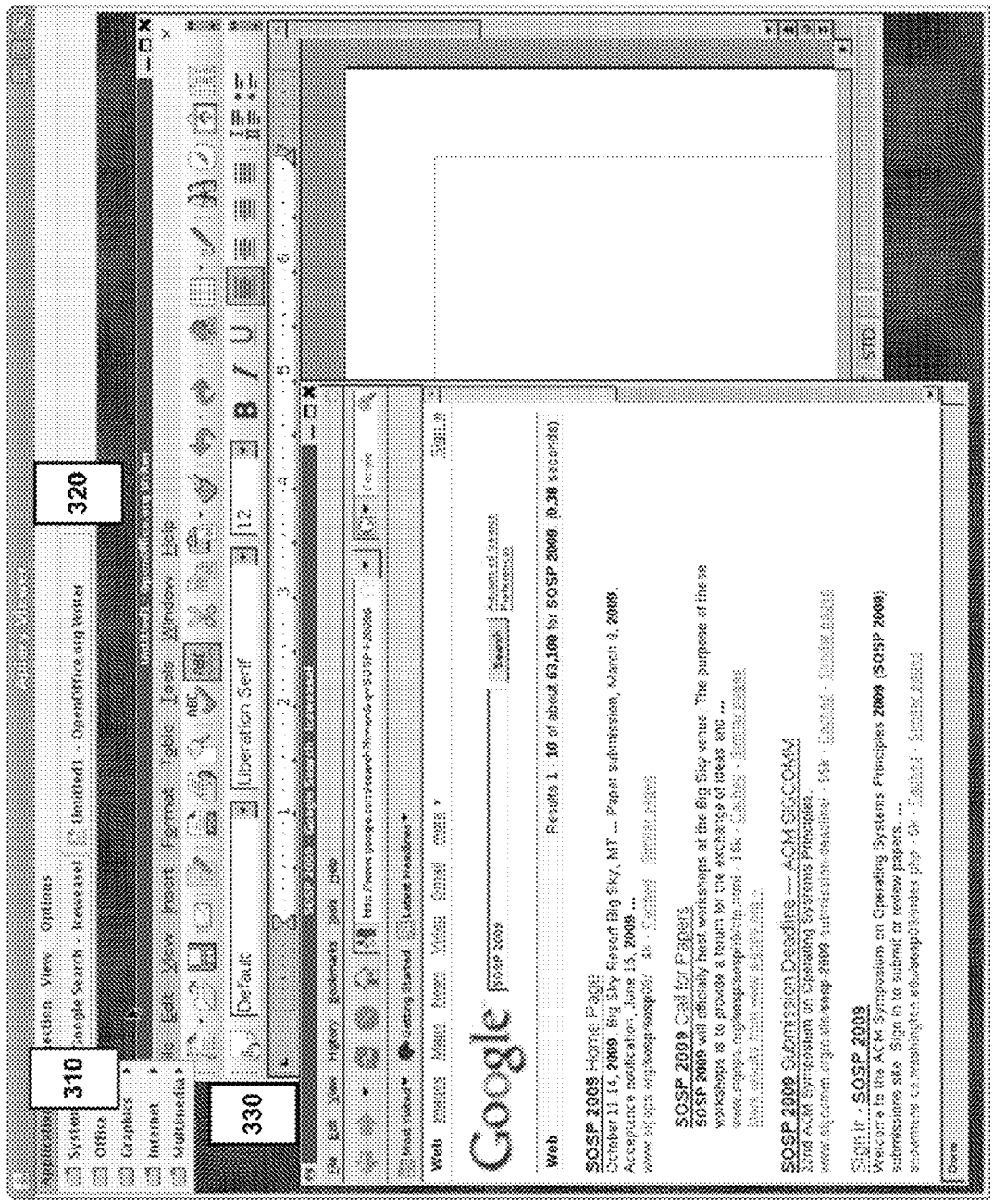
FIG. 3 illustrates an example of a single display view that includes an application menu and a taskbar along with each instantiated container in accordance with some embodiments of the disclosed subject matter.

Along with providing fault containment by isolating applications into separate containers, the containerized desktop system also provides a single integrated display. An illustrative example of the integrated display is shown in FIG. 3. As shown, a user of the containerized desktop system can, among other things, launch applications using an application menu 310, switch between launched applications using a taskbar 320, interact with launched applications, and view launched applications and various application windows in a single integrated display 330. In addition, using the single integrated display 330, the containerized desktop system can provide the user with, for example, clipboard features for use with one or more of the launched applications. In another example, in response to receiving a user selection from application menu 310, the single integrated display 330 can include a viewer component that instructs an application control daemon or any other suitable program to execute the application within its container.

Figure 4:
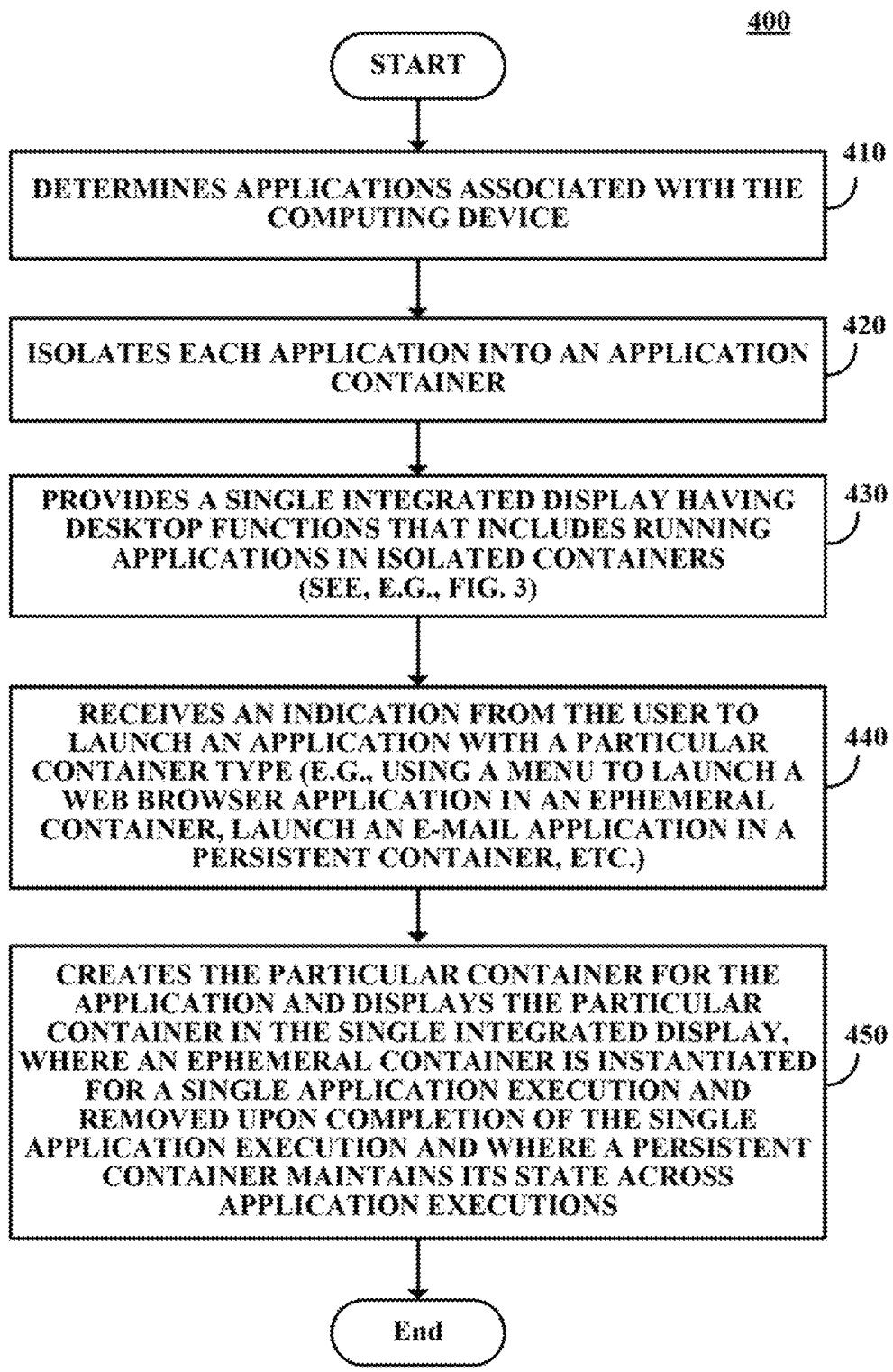
FIG. 4 illustrates an example of a process for application fault containment using the containerized desktop system in accordance with some embodiments of the disclosed subject matter.

FIG. 4 illustrates an example of a process 200 for isolating application faults in accordance with some embodiments of the disclosed subject matter. As shown, process 400 begins by determining the applications associated with a user computing device at 410. For example, as shown in FIG. 1, the containerized desktop system can determine that the user computing device includes an e-mail application, a web browsing application, a paper writing application, and a financial application. At 420, the containerized desktop system isolates each of the determined applications into an application container. As described above, an application that is isolated into an application container is an independent software appliance that provides the system services the application needs to execute. That is, the containerized desktop system is capable of running applications within secure containers to isolate applications from each other.

Alternatively, in some embodiments, the containerized desktop system can allow the user to configure particular applications (e.g., a personal finance application, a paper writing application, a bank web browsing application, etc.). In another embodiment, the containerized desktop system can allow other users (e.g., administrators, software vendors, banking institutions, etc.) to configure particular applications (e.g., a secure bank web browsing application).

At 430, the containerized desktop system provides a single integrated display that includes applications executing in insolated containers. For example, as shown in FIG. 3, an integrated display can be provided to the user that includes one or more application windows running applications in their containers. As described above, the single integrated display can provide the user with additional features, such as an application menu, a taskbar, and clipboard features.

Referring back to FIG. 4, the containerized desktop system can receive an indication from the user to launch an application with a particular container type at 440. For example, the user can use application menu 310 of FIG. 3 or any other suitable interface to select an application for execution. The containerized desktop system can be configured to determine that the selected application should be launched in a container of a particular container type (e.g., a persistent container or an ephemeral container). That is, the containerized desktop system can associate particular applications with particular container types. For example, the containerized desktop system can designate that all media files downloaded or accessed through the Internet are executed within an ephemeral container. In another example, the containerized desktop system can require that, upon selection of an e-mail application, the e-mail application is launched within a persistent container. Alternatively, in some embodiments, the containerized desktop system provides the user with the opportunity to select whether the application should be launched in an ephemeral container or a persistent container.

In some embodiments, the containerized desktop system can display persistent containers and ephemeral containers differently within the single integrated display. For example, applications running in ephemeral containers can be displayed with a red colored border, thereby allowing a user to identify the container type for a given application. However, any suitable indication can be provided to the user, such as a visual indication (e.g., different colored border, different colored background, different font, etc.) or an aural indication (e.g., a particular audio file is played back in response to instantiating an ephemeral container).

In response to receiving the indication to launch an application at 440, the containerized desktop system launches the selected application within the particular container and displays the particular container in an application window within the single integrated display at 450. As described above, an application launched in an ephemeral container is run for a single application execution and, upon completion of the single application execution, the ephemeral container is removed. On the other hand, an application launched in a persistent container maintains its state information across application executions.

In addition to receiving an indication from a user to launch an application, the containerized desktop system can also allow applications within different containers to interact (e.g., where one application launches another application in an ephemeral container), allows users to manage files in each of these containers (e.g., where files are shared or moved between containers), and allows for the management of these containers (e.g., where containers are instantiated quickly and efficiently). For example, in some embodiments, the containerized desktop system includes a file system manager container that provides a global namespace view to move files between containers.

Figure 5:
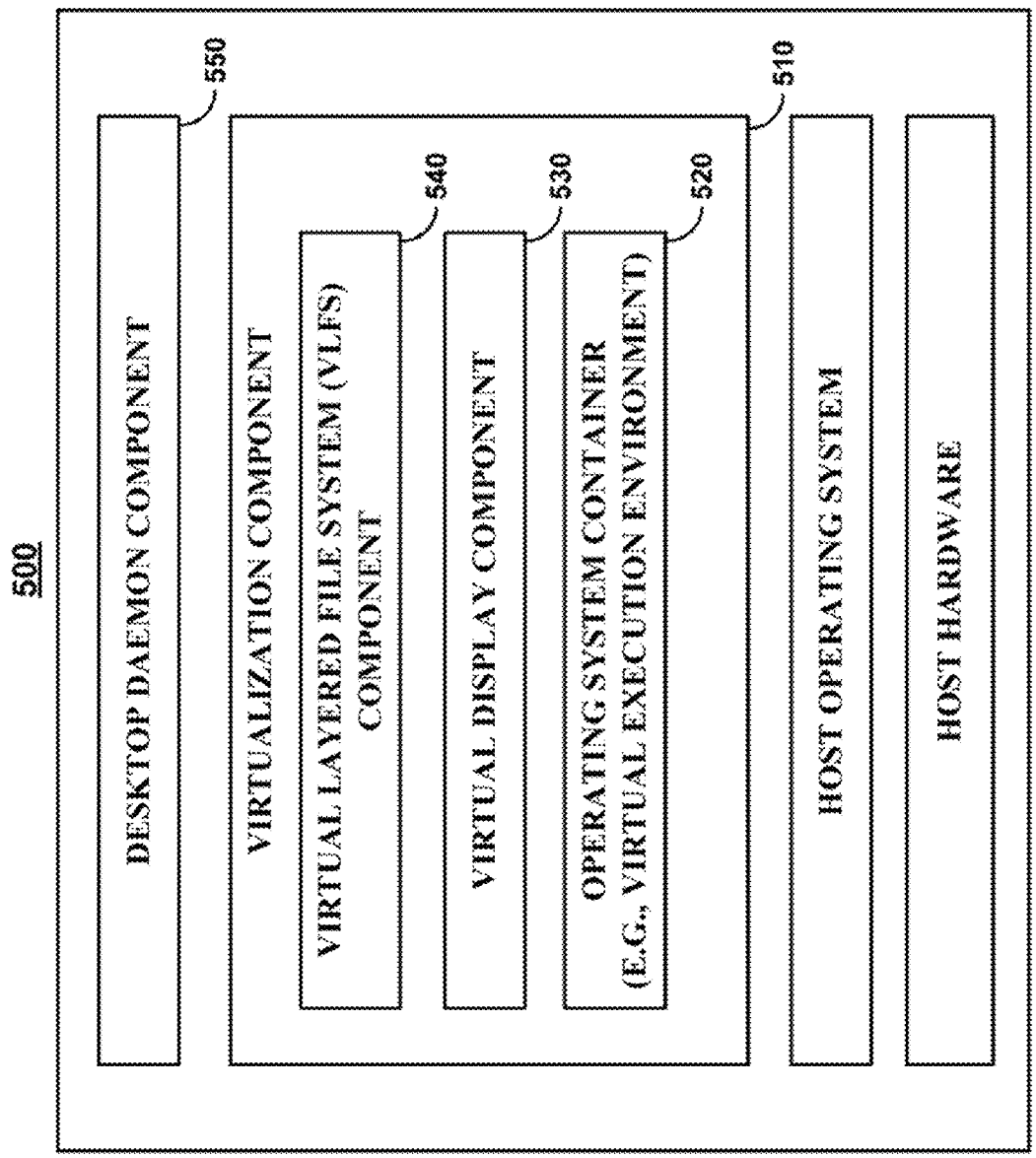
FIG. 5 illustrates a diagram of a system suitable for implementing the containerized desktop system in accordance with some embodiments of the disclosed, subject. matter.

Turning to FIG. 5, an illustrative example of a computer system 500 that can be used for implementing application fault containment mechanisms is shown in accordance with some embodiments of the disclosed subject matter.

Computer system 500 can be a system owned, operated, and/or used by universities, businesses, governments, non-profit organizations, families, individuals, and/or any other suitable person and/or entity. Computer system 500 can include any number of user computers, servers, firewalls, routers, switches, gateways, wireless networks, wired networks, intrusion detection systems, and any other suitable devices. Computer system 500 can include one or more processors, such as a general-purpose computer, a special-purpose computer, a digital processing device, a server, a workstation, and/or various other suitable devices. Computer system 500 can run programs, such as operating systems (OS), software applications, a library of functions and/or procedures, background daemon processes, and/or various other suitable programs. In some embodiments, computer system 500 can support one or more virtual machines. Any number (including only one) of computer system 500 can be present.

As shown in FIG. 5, computer system 500 can include a virtualization scheme or architecture 510 for supporting the containerized desktop system. The virtualization architecture 510 can include, among other things: an operating system container 520, a virtual display component 530, and a Virtual Layered File System (VLFS) component 540. As described further below, operating system container 520 provides a virtual execution environment, virtual display component 530 provides a virtual display server and viewer for each container and integrates the application windows for each container into a single display view, and VLFS component 540 provides a file system in the containerized desktop system. In addition, computer system 500 can include desktop daemon component 550. Desktop daemon component 550 can instantiate containers, manage lifetimes of each container, and integrate the containers together. In particular, desktop daemon component 550 can operate on the host and outside of the one or more instantiated containers.

With respect to persistent and ephemeral containers, computer system 500 provides each container with its own private kernel namespaces, file system, and display server to provide isolation at the process, file system, and display levels. That is, computer system 500 provides isolated containers, where individual applications can run in parallel with separate containers (including separate containers running the same application) and where individual applications have no conception that there are other applications executing. Moreover, programs within separate containers can interact with each other using network communications mechanisms. In addition, each container is provided with an application control daemon that allows a virtual display viewer (e.g., virtual display component 530 of FIG. 5) to query the container for its contents and interact with it. This also allows the containerized desktop system to provide a single display view.

Regarding virtual display component 530, system 500 uses virtual display component 530 to ensure the isolation of the containers at the display level. It should be noted that if the containers directly shared a single display, malicious code within exploited applications can insert events and messages into other applications that are sharing the display, thereby propagating the exploit. To solve this concern, virtual display component 530 provides each container with its own virtual display. The virtual display decouples the display state from the underlying host hardware and enables the display output to be redirected. More particularly, virtual display component 530 can operate as a client-server architecture that transparently provides a virtual display by leveraging a standard video driver interface, a well-defined, low-level, device-dependent layer that exposes the video hardware to the display system. Virtual display component 530 provides a virtual display driver that intercepts drawing commands and redirects them to the client for display. It should be noted that persistent display state is maintained by the display server within each independent container.

As described above, virtual display component 530 integrates the independent displays from each container into a single display view. In a more particular embodiment, system 500 can request that each display provide an alpha channel color for its desktop background such that the viewer can perform a Porter-Duff compositing of the displays using the over compositing operation. This compositing operation can be used to stack the container displays, where object composition is configured to be a series of layers in a stack such that objects higher in the stack visually obscure objects lower in the stack. Porter-Duff compositing can be used by virtual display component 530 to stack the displays for each container based at least in part on the currently used application, while displaying all of the windows associated with each display view. The displays are reordered as a user switches between applications.

In some embodiments, virtual display component 530 provides an integrated menu that lists the applications users are able to select and launch. Virtual display component 530 provides the integrated menu by, for example, leveraging the application control daemon running within each container. Each daemon can enumerate the available applications within the container and can transmit the collected data back to the viewer, which integrates this information into the menu and associates each entry in the menu with a particular container. In response to a user selecting an application from the application menu, the viewer of virtual display component 530 transmits instructions to the appropriate daemon to execute the program within its container.

In some embodiments, virtual display component 530 can also provide a taskbar that allows a user to switch between applications running within the integrated desktop. Similar to providing the integrated menu, each application control daemon can enumerate the application windows provided by each container and can transmit the collected data back to the viewer, which integrates this information into the taskbar and associates each entry or button in the taskbar with a particular container. In response to a user selecting a running application from the taskbar, the viewer transmits instructions to the appropriate daemon to bring the application window and its container to the foreground of the single display (e.g., the display shown in FIG. 3).

Figure 6:
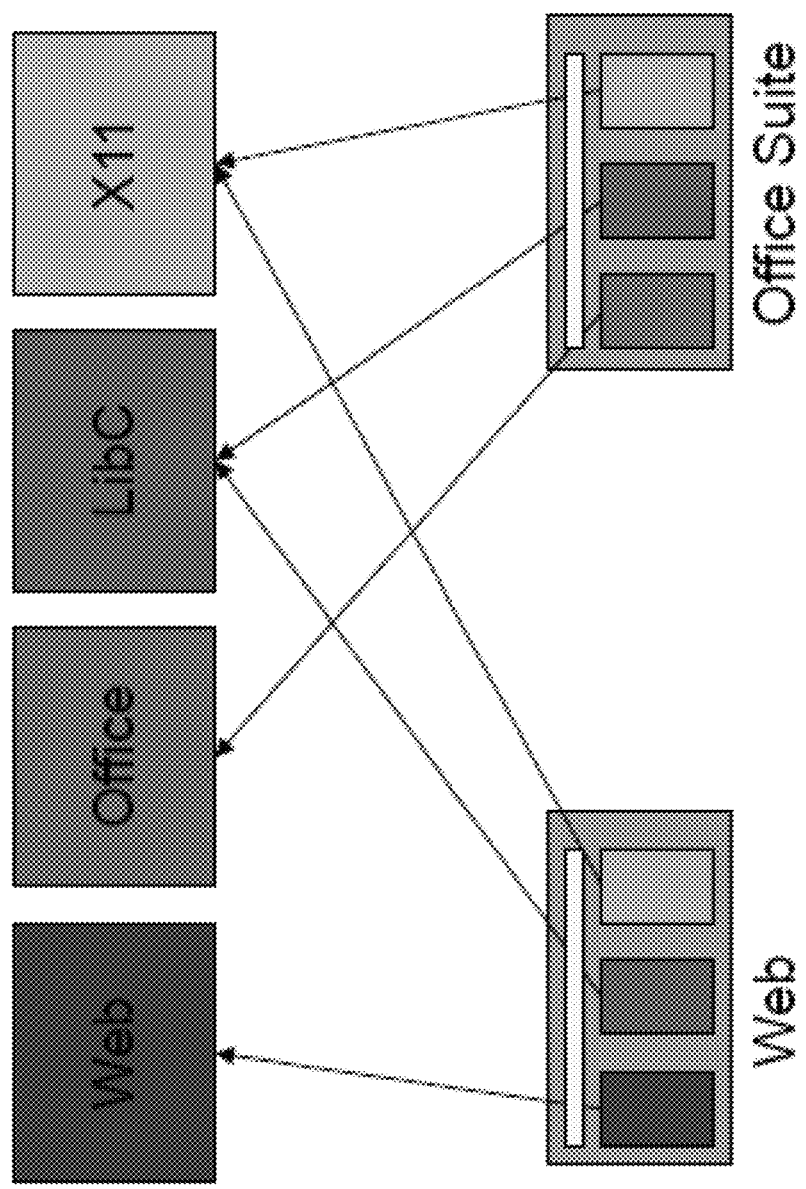
FIG. 6 illustrates an example of the use of shared software layers for creating a virtual layer file system (VLFS) associated with each container in accordance with some embodiments of the disclosed subject matter.
Figure 7:
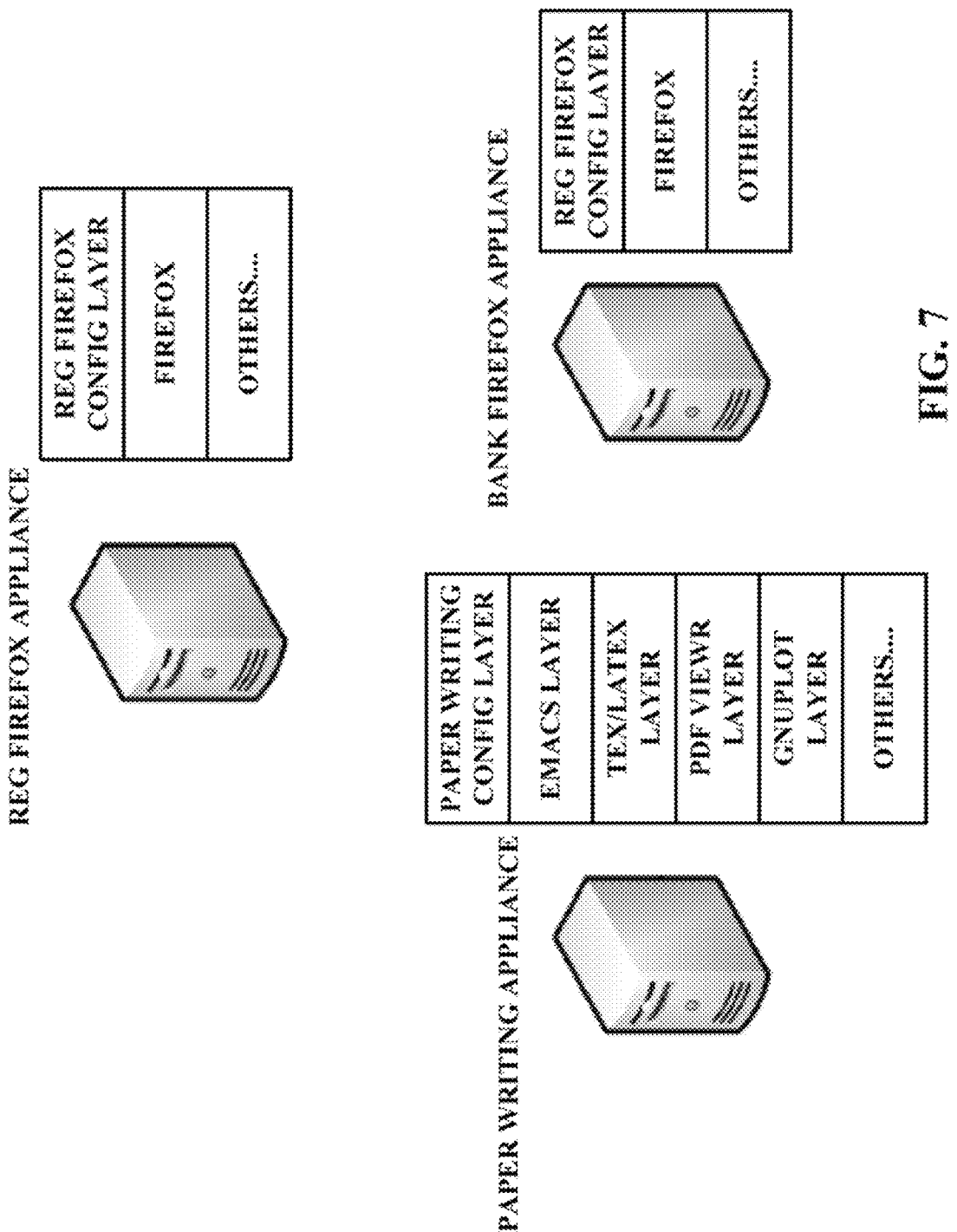
FIG. 7 illustrates an example of the multiple VLFSs created for application containers in accordance with some embodiments of the disclosed subject matter.

In some embodiments, the containerized desktop systems can provide mechanisms that allow application containers to be stored efficiently and instantiated in a timely manner. To do this, system 500 includes virtual layer file system (VLFS) component 540. VLFS component 540 allows one or more file systems to be created by dynamically composing together a collection of individual software layers to provide a single file system namespace view. Each software package or application can be stored as a read-only software file system layer and each container can have its own VLFS. More particularly, the VLFS for each container can be built by combining a set of shared or common software layers together in a read-only manner with the addition of a per container private read-write layer. As shown in FIG. 6, a provisioned VLFS in a web container uses one or more of the shared layers—the web layer, the library (LibC) layer, and the X11 layer. As also shown, a provisioned VLFS in an office suite container combines the office layer, the library (LibC) layer, and the X11 layer from a group of shared layers.

It should be noted that the layers are the building blocks for each VLFS. The layers can include, for example, the metadata that describes the layers, configuration scripts that allow the layer to be added and/or removed from the VLFS, and its file system namespace. A layer's file system namespace is a self-contained set of files providing a specific set of functionality. The files are the individual items in the layer that are composed into a larger VLFS. It should be noted that the files can be, for example, regular files, symbolic links, hard links, devices nodes, and/or any other suitable file. These layers can be stored in a layer repository or any other suitable storage mechanism. A layer repository can include a directory tree, where each portion of the directory tree includes a name and a version associated with a layer. For example, version 3.0.6 of the Mozilla Firefox web browser with a layer version 1 can be stored in the directory tree as firefox_3.0.6-1. Within this directory, the VLFS defines a file system directory that stores this layer's file system namespace as well as a metadata file and scripts directory that stores these components.

It should also be noted that VLFSs can be efficiently provisioned as the VLFS component 540 stores the common files between the VLFSs once in the set of shared layers. The software layers are shared between multiple VLFSs and are not duplicated or copied. As a result, multiple VLFSs (e.g., one for each container) are as efficient as a singular file system. Because a collection of software layers is shared and not duplicated to created independent file systems, the containerized desktop system can efficiently instantiate containers (e.g., without significantly increasing storage space upon an increasing number of instantiated containers, without generating a significant number of duplicative files, etc.). Accordingly, the containerized desktop system is capable of storing the file systems needed by its containers in an efficient manner.

Although it is generally described that a file system is created by dynamically selecting one or more software layers from a set of shared layers, this is merely illustrative. In some embodiments, one or more of these layers can be dependent upon particular layers. Alternatively, one or more of these layers can be incompatible with particular layers or conflict with particular layers. For example, a layer can enumerate its dependencies upon another layer. In a more particular example, while a file system is created by dynamically selecting one or more software layers for a particular application container, the software layers can implicitly select one or more dependent layers for use with the file system. This can allow for automatic provisioning of a complete and consistent file system.

In addition, the VLFS component 540 allows the containerized desktop system to maintain and/or update its containers efficiently. For example, by replacing the single layer that contains the files that have to be updated, each VLFS that uses that layer is also updated. That is, layers can be added, removed, and/or modified without taking the file system offline.

In a more particular embodiment, the VLFS component 540 provides an approach for unioning file systems to join multiple distinct file system namespaces into a single namespace view. These directories are unioned by layering directories on top of one another, joining all the files provided by all the layers into a single file system namespace view.

Further, the VLFS component 540 configures some layers to be read only, while others are read-write. The VLFS leverages this property to enable multiple VLFSs to share a set of software layers in a read-only manner, while providing each instantiated VLFS with its own read-write private layer to store file system modifications.

It should also be noted that directory entries located at higher layers in the stack obscure the equivalent directory entries at lower levels. To provide a consistent semantic, if a file is deleted, a white-out mark is crated to ensure that files existing on a lower level are not revealed. The white-out mechanism enables obscuring files on the read-only lower layers by creating the white-out file on the topmost read-write private layer.

To solve issues arising from the deletion of a file from a read-only layer not being able to reappear, the VLFS component 540 provides a private writeable layer associated with each shared read-only layer in the VLFS for the storage of white-outs. Instead of writing a white-out file to the topmost layer, the white-out can be stored in the associated white-out layer. When a layer from which a file was deleted is replaced, its associated white-out layer is also replaced with an empty white-output layer.

In some embodiments, the VLFS component 540 can provide a revert operation that enables the owner of a file that has been modified to revert the state of the file back to its original state. For example, the revert operation can be used to remove the copy in the private layer, thereby revealing the original copy below it.

To solve issues arising from managing VLFSs while in use, the VLFS component 540 deletes the file name from the file system's namespace, while freeing up the space taken up by the file's contents when it is no longer in use. When a layer is removed from a VLFS, the layer is marked as unlinked, thereby removing it from the file system namespace. While this layer is no longer part of the file system namespace and, therefore, cannot be used by any operations that work on the file system namespace, such as an "open" command, it remains part of the VLFS enabling data operations, such as a "read" operation or a "write" operation, to continue to work correctly for files that were previously opened.

As described above, while the containerized desktop system isolates applications into containers for fault containment, the containerized desktop also allows applications to launch and interact with other applications. More particularly, the use of ephemeral containers can provide a mechanism for allowing applications to launch other applications safely. For example, a user at a computing device may receive e-mail attachments in the form of PDF documents. To avoid compromising the e-mail container by opening an untrusted PDF document that may contain malicious code, the e-mail container creates a separate ephemeral container for viewing the PDF document in response to the user selecting to view the document. If the PDF document contains malicious code, the PDF document has no effect on the e-mail container or any other application or container on the computing device.

The containerized desktop system allows applications in one container to cause the instantiation of an ephemeral container and to cause the execution of an application within that newly instantiated ephemeral container. In some embodiment, a container can be preconfigured with a list of programs (sometimes referred to as "global programs") that other applications can use in an ephemeral manner (e.g., a web browser, a PDF viewer, a media player, etc.). Alternatively, the containerized desktop system can allow the user to select which programs can be used by containers (e.g., default programs for performing particular tasks, user-preferred programs, etc.).

Referring back to the virtual layer file system, the containerized desktop system can populates a single global layer that is shared by each of the container's VLFSs with a wrapper program for each global program. This wrapper program is used to instantiate a new ephemeral container and to execute the requested process within it. Upon execution, the wrapper program determines how it was executed and what options were passed to it. The wrapper program connects over the network to a desktop daemon on the same host and passes this information to it. The daemon maintains a mapping of global programs to containers and determines which container is being requested to be instantiated in an ephemeral manner. This can ensure that only the specified global programs' containers are instantiated, thereby preventing an attacker from instantiating and executing arbitrary programs.

To ensure that ephemeral containers are removed once the single application execution is completed, the desktop daemon can be used to monitor the process executed within the container and, when the process terminates, the desktop daemon removes the container. Similarly, the viewer (e.g., within virtual display component 530 of FIG. 5) can identify which containers are presenting application windows and, upon determining that no more windows are being provided by the container, the viewer can instruct the desktop daemon to terminate the container. This can ensures that an exploited process does not remain running the background.

Figure 8:
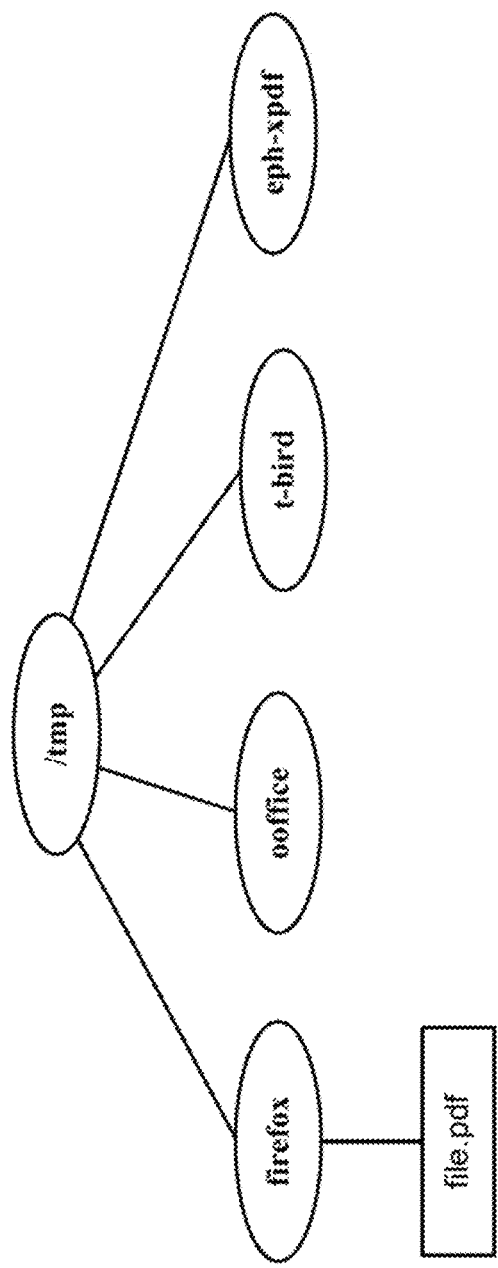
FIG. 8 illustrates an example of using directories and access control lists to allow an application container to instantiate a child ephemeral container in accordance with some embodiments of the disclosed subject matter.

In some embodiments, the containerized desktop system allows private read-only file shares between a parent container and a child ephemeral container that it instantiated. For example, as shown in FIG. 8, the containerized desktop system can restrict this automatic file sharing ability to files located in particular directories, such as a /tmp directory. To ensure that there are no namespace conflicts between containers, the containerized desktop system provides each container with its own private directory under /tmp to use to store temporary files. For example, a Mozilla Firefox container saves temporary files to /tmp/firefox.

In some embodiments, the containerized desktop system provides a special file system that enhances the read-only shares with an access control list that determines which containers can access which files. For example, these directories can appear empty of files to the other containers. This prevents an exploited container from accessing data that was not explicitly given to that container. A file can be visible within the directories if the desktop daemon instructs the file system to reveal that file by adding the container to the file's access control list. For example, when a global program's wrapper is executed and the desktop daemon determines that a file was passed to it, the daemon adds the ephemeral container to the file's access control list.

Referring back to FIG. 8, a Firefox container can created a new ephemeral Xpdf container for viewing a PDF file named file.pdf. The desktop daemon adds the ephemeral container to the file's access control list and allows /tmp/firefox/file.pdf to be visible to the new ephemeral container. The ephemeral Xpdf container executes the program and displays the PDF document to the user.

It should be noted that any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Btu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for application fault containment are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for application fault containment, the method comprising:
   determining a plurality of applications associated with a processing device;
   isolating each of the plurality of applications into an application container;
   receiving a user selection of one of the plurality of applications;
   determining a container type for the user selected application, wherein the container type is one of a persistent container and an ephemeral container; and
   creating the application container of the container type for the user selected application in response to receiving, the user selection;
   wherein:
      upon determining that the container type is the persistent container, configuring the created application container to maintain state information across executions of the user selected application; and
      upon determining that the container type is the ephemeral container, configuring the created application container to be removed after a single execution of the user selected application.

2. The method of claim 1, wherein each application is isolated into the application container by providing at least one of programs and system services needed to execute the application.

3. The method of claim 1, wherein the container type is predetermined and, in response to receiving the user selection, the application container is created having the predetermined container type.

4. The method of claim 1, further comprising inhibiting the application container from accessing user data stored on the processing device.

5. The method of claim 1, further comprising monitoring the application executing within the ephemeral container to determine when to remove the ephemeral container.

6. The method of claim 1, further comprising providing an integrated display that includes the created application container and other created application containers.

7. The method of claim 6, further comprising providing a virtual display component for generating the integrated display, wherein the virtual display component provides a virtual display server and viewer for the application container and displays an application window corresponding to the application container.

8. The method of claim 1, wherein the application container is created using a daemon component, wherein the daemon component manages the application container and a lifetime associated with the application container.

9. The method of claim 1, wherein a plurality of shared software layers are stored in the processing device and wherein each of the plurality of shared software layers is a read-only layer that stores a program.

10. The method of claim 9, wherein the application container has a corresponding file system and wherein the file system is created by dynamically selecting one or more software layers from the plurality of shared software layers.

11. The method of claim 10, wherein the dynamically selected software layers are designated read-only and wherein the corresponding file system further comprises a private layer that is designated read-write for storing modifications to the file system.

12. The method of claim 1, further comprising:
receiving a request from the user selected application to instantiate a second application in another application container; and
in response to receiving the request, creating a child ephemeral container that executes the second application.

13. A system for application fault containment, the system comprising:
a processor that:
determines a plurality of applications associated with a processing device;
isolates each of the plurality of applications into an application container;
receives a user selection of one of the plurality of applications;
determines a container type for the user selected application, wherein the container type is one of a persistent container and an ephemeral container; and
creates the application container of the container type for the user selected application in response to receiving the user selection;
wherein the processor is further configured to:
configure the created application container to maintain state information across executions of the user selected application upon determining that the container type is the persistent container; and
configure the created application container to be removed after a single execution of the user selected application upon determining that the container type is the ephemeral container.

14. The system of claim 13, wherein the processor is further configured to monitor the application executing within the ephemeral container to determine when to remove the ephemeral container.

15. The system of claim 13, wherein the processor is further configured to provide an integrated display that includes the created application container and other created application containers.

16. The system of claim 13, further comprising a virtual display component that provides a virtual display server and viewer for the application container and displays an application window corresponding to the application container.

17. The system of claim 13, further comprising a daemon component that creates the application container, wherein the daemon component is configured to manage the application container and a lifetime associated with the application container.

18. The system of claim 13, wherein the processor is further configured to store a plurality of shared software layers, wherein each of the plurality of shared software layers is a read-only layer that stores a program.

19. The system of claim 18, wherein the application container has a corresponding file system and wherein the processor is further configured to create the file system by dynamically selecting one or more software layers from the plurality of shared software layers.

20. The system of claim 19, wherein the dynamically selected software layers are designated read-only and wherein the processor is further configured to provide a private layer that is designated read-write for storing modifications to the file system.

21. The system of claim 13, wherein the processor is further configured to:
receive a request from the user selected application to instantiate a second application in another application container; and
in response to receiving the request, create a child ephemeral container that executes the second application.

22. A non-transitory computer-readable medium containing computer-executable instructions that, when executed by a processor, cause the processor to perform a method for application fault containment, the method comprising:
determining a plurality of applications associated with a processing device;
isolating each of the plurality of applications into an application container;
receiving a user selection of one of the plurality of applications; and
determining a container type for the user selected application, wherein the container type is one of a persistent container and an ephemeral container; and
creating the application container of the container type for the user selected application in response to receiving the user selection;
wherein:
upon determining that the container type is the persistent container, configuring the created application container to maintain state information across executions of the user selected application; and
upon determining that the container type is the ephemeral container, configuring the created application container to be removed after a single execution of the user selected application.

* * * * *